Jan. 12, 1960   O. M. LEWIS   2,920,688
TIRE BEAD LOOSENING DEVICE
Filed Jan. 31, 1958   2 Sheets-Sheet 2
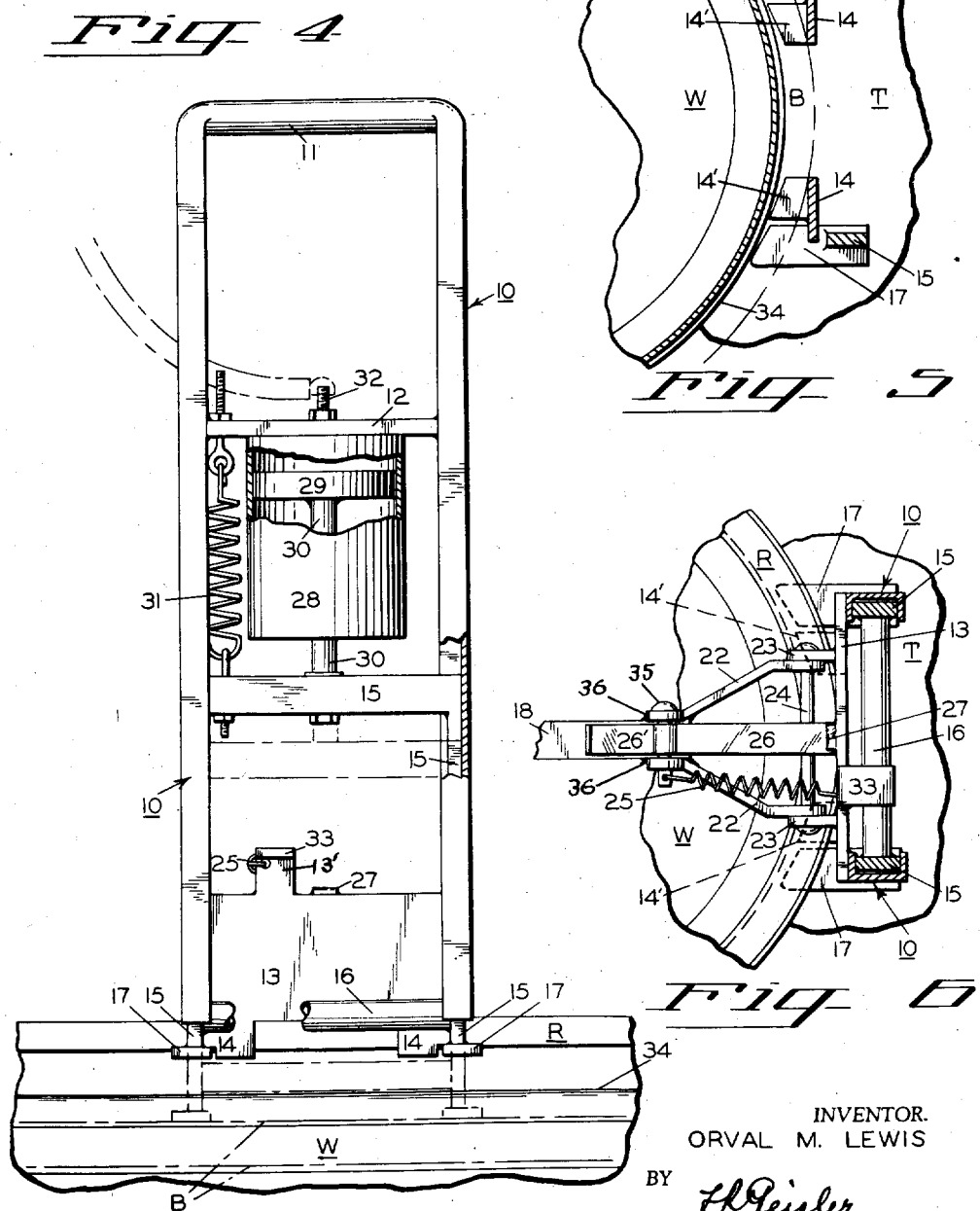
INVENTOR.
ORVAL M. LEWIS
BY
*T.R. Geisler*
ATTORNEY

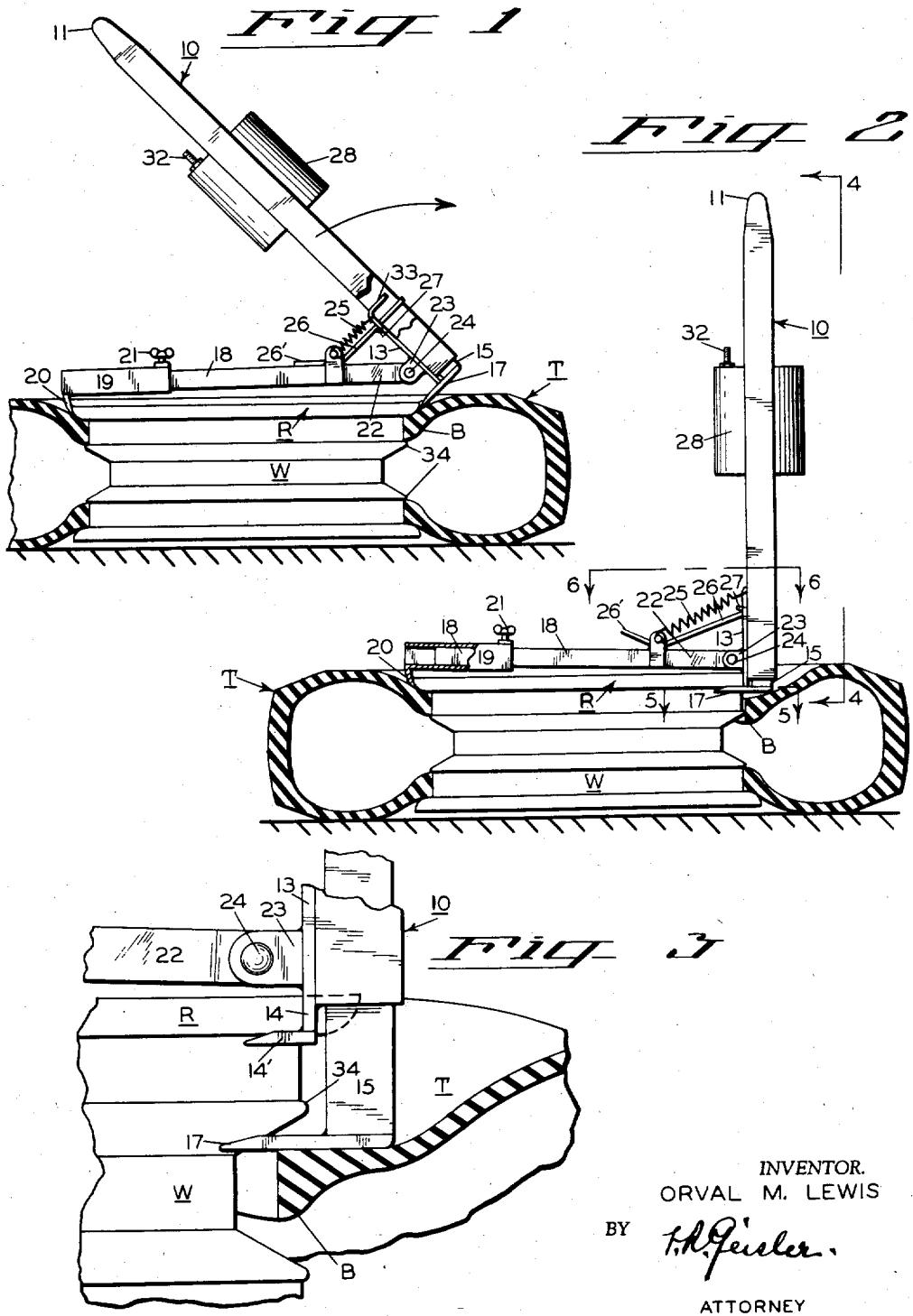

United States Patent Office 2,920,688
Patented Jan. 12, 1960

2,920,688

TIRE BEAD LOOSENING DEVICE

Orval M. Lewis, Sweet Home, Oreg.

Application January 31, 1958, Serial No. 712,562

1 Claim. (Cl. 157—1.17)

This invention relates to improved means for removing tires from wheel rims, and, more specifically, relates to tools for loosening a tire bead from its holding rim preparatory to the actual operation of removing the tire from the wheel.

As is well known, a necessary preparatory step in the removing of a tire from a wheel is the loosening of the beads or rims of the tire from the adjacent holding or rim-flange portions of the wheel against which the tire beads have been tightly held. Until this is done it is not possible to insert the usual tire removing bar or tool (or corresponding members of the various tire removing devices now in use) in between a tire bead and a wheel for removing the tire. This preparatory loosening of the tire beads, however, often requires considerable time and effort, particularly if the tire has been mounted on the wheel sufficiently long to cause the tire beads to become stuck to the adjacent wheel rim portions, and this is also especially true in the case of some of the modern tubeless tires and safety wheels. Generally the customary procedure for loosening the tire beads heretofore has been for the operator, after placing the wheel on its side on the ground, to jump on the tire and then, if this is not sufficient, to pound the tire with a suitable mallet until the beads of the tire have been loosened enough to allow sufficient access for the tire removing tool or device. Such procedure often requires considerable time and effort as well as being otherwise objectionable.

The object of the present invention is to provide a simple and practical device by which sufficient preparatory loosening of the tire beads from the adjacent holding portion of the wheel rim can be accomplished quickly and easily with a minimum amount of exertion on the part of the operator.

A further and specific object of the invention is to provide a tire bead loosener which will be operated largely by the employment of air under pressure and thus enable the operator in any garage or automobile service station, equipped with the customary air hose and source of compressed air for inflating vehicle tires, to use this form of power in place of the usual prolonged manual effort with which the loosening of the tire beads heretofore has generally been accomplished.

The construction and manner of operation of this tire bead loosening device will be described briefly with reference to the accompanying drawings.

In the drawings:

Figure 1 is a side elevation of the device showing it being set in place on the vehicle wheel from which the tire bead is required to be loosened, the tire being shown in section;

Figure 2 is a side elevation similar to Figure 1 showing the device fully set in place, completing the first stage of the operation, with the tire bead thrust down a slight distance;

Figure 3 is an enlarged fragmentary elevation, with a portion of the tire shown in section, illustrating the next stage of the operation in which the engaged portion of the tire bead is thrust down to the desired extent by the device;

Figure 4 is an enlarged front elevation taken on line 4—4 of Figure 2;

Figure 5 is an enlarged fragmentary section on line 5—5 of Figure 2; and

Figure 6 is an enlarged fragmentary plan view of the lower portion of the device taken on line 6—6 of Figure 2.

In the drawings the wheel on which the tire is mounted is indicated by the reference character W, the top rim of the wheel by R, the tire by T, and (in Figures 1, 2 and 3) the top bead of the tire, which requires to be loosened first from the wheel rim, is designated by the reference character B.

Referring now to Figures 1, 2 and 4, the device includes a main frame 10 comprising a pair of parallel channel irons connected at the top by an integral cross member 11, the surface of which cross member is rounded so as to enable this top cross member to form the main handle for the device. The two parallel channel irons are joined further by a cross bar 12 (Figure 4) which has its ends welded in the channel members of the main frame, and by a bottom cross plate 13 which is welded to the rear faces of the two parallel channel members. A pair of spaced extensions 14, 14 project downwardly from the bottom edge of the bottom cross plate 13 and are adapted to extend down over the rim of the wheel when the device is in operating position. A pair of rim-engaging toes 14', 14' (shown best in Figure 5) are secured to the bottom of the extensions 14, 14, respectively, and extend inwardly towards the wheel.

An inverted U-shaped frame 15 is slidably mounted in the lower portion of the main frame 10, being slidable in the channel irons of the main frame (Figures 4 and 6). A pair of tire bead thrusting members 17, 17 (see also Figure 5) are mounted on the bottom ends of the slidable frame 15, are located adjacent the rim engaging toes 14', 14' respectively, and also extend inwardly towards the wheel. The inverted U-shaped frame 15 is strengthened by a bar 16 located near the bottom of this frame.

A closed air cylinder 28 (Figure 4) is rigidly secured at its top to the cross bar 12 of the main frame 10. A piston 29 within the cylinder has a piston rod 30 which extends down through the bottom of the cylinder and which is firmly attached to the top of the slidable inverted U-shaped frame 15. A coil spring 31, having its end attached to the cross bar 12 and to the top of the slidable frame 15 respectively, exerts a constant force to maintain the slidable frame in the normal raised position shown in full line in Figure 4, but permits the slidable frame 15 to be thrust downwardly by the piston and piston rod against the force of the spring 31 whenever sufficient air under pressure is delivered into the cylinder 28 above the piston 29. An air valve 32 is mounted in the top of the cylinder 28 to permit air under pressure to be delivered into the cylinder and then subsequently to be exhausted from the cylinder. A stop 33, mounted on an upper extension 13' of the bottom cross plate 13, limits the downward travel of the slidable frame 15.

A cross bar 18 (Figures 1 and 2), carrying an adjustable sleeve 19 on its outer end, has its inner or opposite end welded to a pair of bracket arms 22, 22 (Figure 2) which in turn are mounted on a hinge bolt 24 extending through a pair of ears 23, 23 secured on the rear face of the bottom cross plate 13 of the main frame 10. The sleeve 19 carries a claw 20 extending downwardly and inwardly and adapted to engage the rim R of the wheel W. The sleeve 19 is adjustably secured in place on the outer end of the cross bar 18 by any suitable means such as the set screw 21.

A latch 26 is pivotally mounted on a bolt 35, extending between a pair of ears 36 on the inner end of the cross bar 18. A coil spring 25 has one end connected to the bolt 35 and the other end secured to the upper extension 13' of the bottom cross plate 13. This spring 21 is under tension at all times. When the main frame 10 is swung into upright position, as illustrated in Figure 2, with the cross bar 18 remaining in substantially horizontal position, the free end of the latch 26 engages a locking lug 27 at the top of the bottom cross plate 13. The latch 26 has a lower extension 26' arranged at an angle with respect to the main portion of the latch as an aid in releasing the latch when the main frame 10 is to be swung down to lowered position on the cross bar 18.

When the device is to be used the sleeve 19 is set in proper position on the cross bar 18, depending upon the diameter of the wheel rim from which the tire bead is to be loosened, so that the claw 20 of the sleeve will extend in under the rim R on one side of the rim while the pair of rim-engaging toes 14', 14' at the bottom of the main frame cross plate 13, together with the companion tire-engaging feet 17, 17 at the bottom of the slidable frame 15, engage the under side of the rim R at the opposite side. Then, with the cross bar 18 thus extending diametrically across the top of the wheel, the main frame 10 is swung into upright position, and thus from the position of Figure 1 to the position of Figure 2. This results in causing the rim-engaging members 14', 14' and 17, 17 to be forced further in under the rim R, whereupon the latch 26 temporarily locks the main frame 10 and the cross bar 18 into their relative positions shown in Figure 2. The mounting of the device on the wheel rim in this manner and the bringing of the main frame 10 into upright position, and thus placing the device in the operating position illustrated in Figure 2, completes the first stage in the operation of loosening the top tire bead B.

After the device has been properly set in this position, as shown in Figure 2, the operator connects an air hose from any suitable source of air under pressure to the valve 32 of the cylinder 28. The resulting downward movement of the air piston 29 with the piston rod 30 and slidable frame 15, while the main frame 10 is held against upward movement by engagement of the toes 14', 14' with the underside of the rim R, causes the pair of spaced tire-engaging members or feet 17, 17 on the bottom of the slidable frame 15 to thrust the tire bead downwardly from the rim R to the position shown in part in Figure 3. All of this takes place quickly and without any effort on the part of the operator. The air hose is then removed from the valve 32 of the cylinder 28 and the operator allows the air to exhaust from the cylinder and the slidable frame 15 to return to normal raised position under the pull of the spring 31.

Due to the fact that the tire-engaging members 17, 17 are spaced a considerable distance apart a substantial portion of the tire bead will be thrust downwardly from the wheel rim. This generally will be sufficient as far as the top tire bead is concerned, although in extreme cases the operation can be repeated if necessary after shifting the position of the device on the same top rim of the wheel so as to thrust an opposite portion of this tire bead downwardly similarly.

Some of the modern wheels for tubeless tires are provided with inner annular shoulders for engaging the inner peripheries of the tire rims or beads as an added safety feature. Such a shoulder is shown at 34 in Figures 1 and 3. These shoulders on such wheels make the loosening of the tire beads by the heretofore customary methods even more difficult. However, the device of the present invention will push the engaged portion of the tire bead or rim over this shoulder and on down into the "drop center" portion of the wheel without any difficulty.

In many cases the loosening of one bead of a tire will suffice for the subsequent removal of the entire tire from the wheel. However, should the other bead of the tire also require to be loosened before the tire can be removed, then the wheel is turned over to bring its other face on top and the operation is repeated on the other rim of the wheel for this other bead of the tire in exactly the same manner.

I claim:

A tire bead loosening device consisting of a rigid main frame structure having a pair of parallel side channel members connected at the top by a handle member, an inverted U-shaped frame slidable in said channel members, a pair of tire-bead-thrusting feet secured to the bottom ends of said slidable frame respectively, a cross plate secured on the lower end of said main frame structure, a pair of rim-engaging toes secured to the bottom of said cross plate and positioned between said tire bead thrusting feet, spring means in said main frame structure connected with said slidable frame and normally holding said slidable frame in raised position with said thrusting feet in transverse alignment with said rim-engaging toes, an air cylinder secured in said main frame structure above said slidable frame, a piston in said cylinder, a piston rod connecting said piston with said slidable frame, means for delivering air under pressure into the top of said cylinder, whereby to move said slidable frame forcibly downwardly in said main frame structure, a rim anchoring cross bar, one end of said cross bar having a hinged connection with the forward side of said cross plate, a sleeve slidably mounted on the other end of said cross bar, a rim-engaging hook on said sleeve, means for clamping said sleeve in desired position on said cross bar, spring means connecting said main frame structure with said cross bar and exerting a force to cause said main frame structure to swing down on said cross bar, and a latch holding said main frame structure substantially perpendicular to said cross bar when said main frame structure is swung upwardly from said cross bar on said hinged connection against the force of said spring means, whereby, when said rim-engaging hook on said sleeve and said rim-engaging toes on said cross plate are set in place on a wheel rim and said main frame structure is swung upwardly from said cross bar until said latch is engaged, said main frame structure will be held firmly on the wheel while the tire bead is loosened from the wheel rim with the operation of said air cylinder and piston.

References Cited in the file of this patent

UNITED STATES PATENTS

| | | |
|---|---|---|
| 1,394,400 | Berg | Oct. 18, 1921 |
| 1,983,608 | Hand | Dec. 11, 1934 |
| 2,367,638 | McCulloch | Jan. 16, 1945 |
| 2,495,117 | McCollister | Jan. 17, 1950 |
| 2,679,896 | Branick | June 1, 1954 |
| 2,801,684 | Salsbury | Aug. 6, 1957 |